March 1, 1960

S. R. STILES ET AL 2,927,009

HYDROCARBON CONVERSION APPARATUS

Filed Oct. 20, 1953

INVENTORS
SAMUEL R. STILES
JAMES WARBURTON
JOHN M. BLACK
BY
ATTORNEYS

March 1, 1960

S. R. STILES ET AL 2,927,009

HYDROCARBON CONVERSION APPARATUS

Filed Oct. 20, 1953

INVENTORS
SAMUEL R. STILES
JAMES WARBURTON
JOHN M. BLACK

BY *[signatures]*

ATTORNEYS

United States Patent Office 2,927,009
Patented Mar. 1, 1960

2,927,009

HYDROCARBON CONVERSION APPARATUS

Samuel R. Stiles, Cresskill, and James Warburton, Rutherford, N.J., and John M. Black, Plandome, N.Y., assignors to The M. W. Kellogg Company, Jersey City, N.J., a corporation of Delaware Application October 20, 1953, Serial No. 387,118

9 Claims. (Cl. 23—285)

This invention relates to a process and apparatus for carrying out liquid phase reactions with a liquid catalyst which is immiscible with the reactants. More particularly, the invention relates to a process and apparatus for carrying out liquid phase reactions of hydrocarbons in the presence of an acid catalyst which is immiscible with the hydrocarbon reactants and products. Still more particularly, the invention relates to a process and apparatus for carrying out liquid phase alkylation of hydrocarbons in the presence of an acid catalyst such as sulfuric acid.

In carrying out liquid phase reactions in the presence of a liquid catalyst which is immiscible with the reactants, it is necessary to secure intimate mixing of the catalyst and the reactants to thereby form and maintain an emulsion in which either the reactants or the catalyst constitutes the continuous phase. In the alkylation of hydrocarbons, which will be referred to as illustrative of the reactions to which the present invention is applicable, it is necessary to effect intimate mixing of the hydrocarbon reactants and the acid catalyst to obtain the benefits of the catalytic action of the acid catalyst; the degree of mixing of the hydrocarbons and acid is an important factor in determining the rate of conversion and the overall efficiency of the operation. In the alkylation of isoparaffin hydrocarbons with olefin hydrocarbons in the presence of sulfuric acid, referring to the alkylation of isobutane with butenes and/or propylenes as an example, apparently the olefin hydrocarbons are absorbed by the sulfuric acid while the isoparaffin hydrocarbons present remain in a separated phase as droplets. Alkylation reactions apparently take place at the surface of the droplets forming the discontinuous phase of the emulsion. The degree of mixing of the emulsion and the resulting dispersion of the isobutane droplets in the acid phase of the emulsion apparently have an important effect on the rate at which the reaction occurs at the surface of the isobutane droplets. Such a process is operated in the prior practice with a view to forming and maintaining a proper body of emulsion so as to assure high overall efficiency. Ordinarily a plurality of series arranged communicating reaction zones are used, into the first of which the acid and the bulk of the isobutane are introduced for series flow through the zones while the olefin feed is supplied in parallel streams to the respective reaction zones and emulsified by appropriate mixing means therein. The overflow from one reaction zone passes to the next reaction zone; from the last reaction zone the product overflow passes to the product-acid separation section. The mixing means employed in the reaction zones ordinarily have greater capacity than required to handle the acid and reactants supplied to the respective zones so that recirculation of materials in the respective zones takes place. Since the zones contain materials of different densities, stratification can and does take place. No effective provision is made for forcing the lighter material down to the inlet of the mixing means. Also, since the upper end of the zones are in open communication, lighter materials can flow from any one zone to the product separation section without reaching the mixing means of any subsequent zone.

Concurrently with the alkylation reaction, there is a condensation reaction of the olefin hydrocarbons in the sulfuric acid which may be termed "hydropolymerization." The condensation products of this reaction are undesirable as they reduce the yield of desired products, accumulate in the acid phase and in the emulsion, and impair the catalytic activity of the acid. The "hydropolymerization" reaction rate increases with the concentration of the olefin hydrocarbon reactants and the reaction temperature. To improve the efficiency, both with regard to the alkylate product and the sulfuric acid employed, the alkylation reaction is usually carried out at comparatively low temperatures and at low concentrations of olefin hydrocarbon reactants. Thus it is important to maintain in the reaction zone a relatively high concentration of isobutane and as high a ratio of isobutane to olefin reactants as is practicable. To this end an isobutane to olefin feed rate ratio of about 6–10:1 and higher is commonly employed.

It has been found in accordance with the present invention, that the reaction between the isoparaffin hydrocarbons and the olefin hydrocarbons is driven preponderantly in the direction of the alkylation reaction and the undesired products, due to the "hydropolymerization" reaction, reduced to a minimum if a high isoparaffin-olefin ratio is maintained in the region of introduction and intermixing of the olefin hydrocarbon into the isoparaffin hydrocarbon-acid emulsion; isoparaffin hydrocarbon-olefin ratios in the introduction and intermixing region as low as 200:1 will give important improvements in the results, but the best results are obtained with ratios in the order of 400:1 and higher.

It is an object of this invention to provide a process and apparatus for effecting liquid phase alkylation of isoparaffin hydrocarbons with olefin hydrocarbons in the presence of an acid catalyst in which the acid catalyst and the isoparaffin hydrocarbon reactants are progressed in series flow through a plurality of reaction zones, while the olefin hydrocarbon reactants are supplied in parallel flow to the plurality of reaction zones to be intimately intermixed thereat substantially as supplied with the isoparaffin hydrocarbon and the acid catalyst flowing through the respective reaction zones, the series flow of the isoparaffin hydrocarbon and the acid catalyst being from the bottom to the top of a respective zone and from thence to the bottom of the next zone, the mixing means being located at the bottom of each of said zones so that no material can pass through any one of said zones without passing through the respective mixing means and traversing the full length of said zone; said mixing means furthermore inducing a sufficiently high flow rate in the region of olefin hydrocarbon introduction to establish thereat a desired high isoparaffin hydrocarbon-olefin hydrocarbon ratio.

It is also an object of this invention to provide a process and apparatus for effecting liquid phase alkylation of isoparaffin hydrocarbons in which the acid catalyst and the isoparaffin hydrocarbon reactants are progressed in series flow through a plurality of mixing and reaction zones, while the olefin hydrocarbon is supplied in parallel flow to each of said zones; said mixing zones being separate and maintained at pressures sufficient for evaporation of hydrocarbon supplied to the feed for autorefrigeration of said reaction zones, said pressures being adjusted and controlled to promote the flow of the materials through said separate zones.

The invention will be particularly described with reference to the accompanying drawings which illustrate the process by reference to embodiments of the apparatus of the invention. It is to be understood, however, the invention is not limited by reference to the specific modifications illustrated by the drawings but is capable of other modification within the scope of the invention.

In the drawings,

Fig. 1 is a side view partly in section illustrating one embodiment of the apparatus of the invention;

Figs. 2 and 3 are sectional views of the apparatus of Fig. 1 taken on lines 2—2 and 3—3 respectively;

Figure 1:
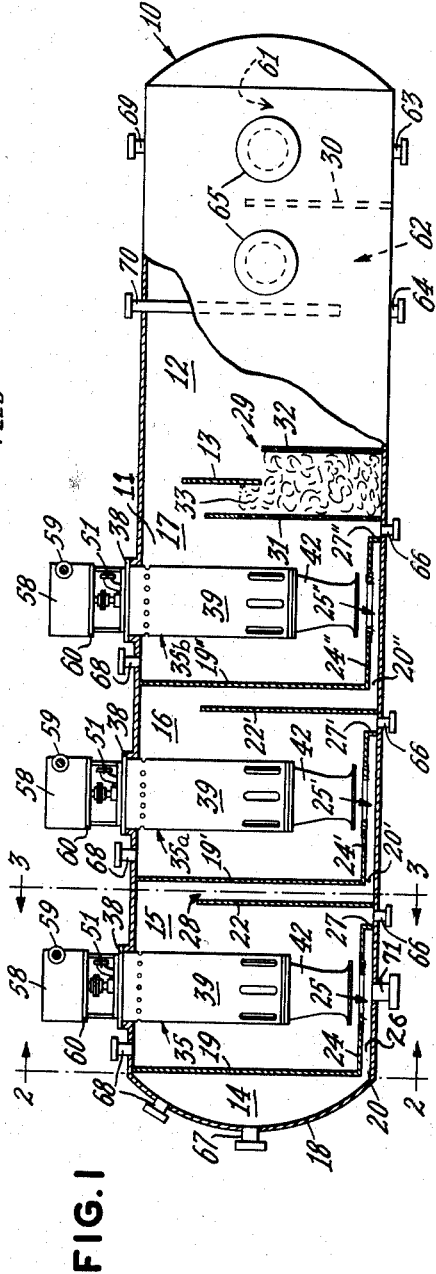

Referring to Fig. 1, the reactor 10 may be of any convenient shape and size but is preferably in the form of a closed ended cylindrical or approximately cylindrical tank as shown. The reactor 10 is divided by means of a baffle or deflector plate 13 into a reaction zone 11 and a settling zone 12. The reaction zone 11 is conveniently of approximately the same volume as the settling zone 12 but this ratio is subject to wide variation.

Figure 2:
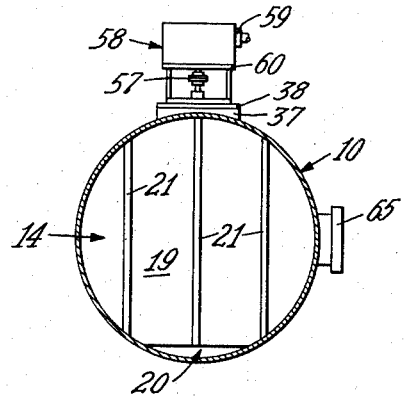
Figure 3:
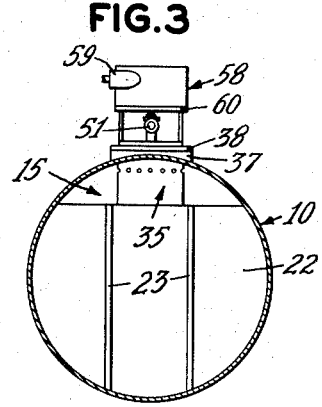

The reaction zone 11 is divided into an entrance section 14 and a plurality of mixing sections, three mixing sections 15, 16 and 17 being included in the reactor 10 shown but two, or more than three, may be employed as operating conditions require. The entrance section 14 is at one end of the reactor 10 and is defined by the dished head 18 and the circular partition 19. The partition 19, as shown in Fig. 2, has a bottom section thereof removed to provide a port 20 through which material in the section 14 may pass for entrance into the bottom of the mixing section 15. The periphery of the partition 19 is united, as by welding, to the walls of the reactor 10 and may have stiffening and reinforcing means united thereto, as for instance the rectangular bars 21 which are welded to either or both sides of the partition 19. Mixing section 15 is defined by the cylindrical walls of the reactor 10 and has one end closed by the partition 19 and the other end by the partition 19'. The weir partition 22 is provided adjacent the partition 19'. As shown in Fig. 3, the partition 22 is likewise circular but has a much larger section removed from its top and is arranged to form a weir which establishes the material level in the mixing chamber 15 and thus controls the outflow of materials therefrom. If desired a weir notch, not shown, may be formed in the top of the partition 22 for more accurate material level control. The periphery of partition 22 is likewise united, as by welding, to the walls of the reactor 10 and may also have stiffening and reinforcing means united thereto, as for instance the rectangular bars 23 which are welded to either or both sides of the partition 22. The bars 21 and 23 may also be used as a spacing means as will be explained hereinafter. A rectangular plate 24 having a hole 25 therein has one end united to the bottom edge of the partition 19 and its sides united to the cylindrical wall of the reactor 10, as by welding, to provide a passageway 26 for flow of material from the bottom of the entrance chamber 14 to substantially the middle region of the bottom of the mixing section 15. The hole 25 may be circular or rectangular, as preferred. A small plate 27 in the form of a section of a circular disc is united to the walls of the reactor 10 and to the end of the rectangular plate 24 to close the end of the passageway 26 so that all the material that enters the port 20 can only pass into the mixing chamber 15 through the hole 25. If deemed necessary a small hole, not shown, may be drilled through the plate 27 adjacent the bottom thereof for drainage purposes, otherwise no holes or ports are provided in any of the partition members mentioned.

The construction of the mixing section 16 is substantially identical to that of the section 15, the corresponding parts of the section 16 are designated by primed numerals. The material from the mixing section 15 over- flows the top edge of the partition 22, then flows down through the down-flow passageway 28, formed between the partitions 22 and 19' to enter the port 20'. The bars 21 and 23 can be made of such a width that the exposed edges thereof bear against the respective opposed partition 19' or 22 and thus maintain the spacing between the partitions 19' and 22. The mixing section 17 is similar to the section 15 and the corresponding parts thereof have been designated by double primed numerals. The mixing section 17 differs from the mixing sections 15 and 16 primarily in that the downstream end thereof is defined by the coalizer partition 29 and the deflector plate 13 and in that it is in open communication at its top with the settling zone 12.

The deflector plate 13 is united to the walls of the reactor 10 and extends from a level considerably above the top of the partitions 22 and 22' to a level somewhat below the top of the settling zone partition 30, to be hereinafter referred to, so that all of the liquid material that passes from the reaction zone 11 to the settling zone 12 must pass through the coalizer 29. The coalizer partition 29 is defined by the spaced partitions 31 and 32. The space between the partitions 31 and 32 is filled with a suitable packing 33 such as carbon Raschig rings, or crushed siliceous rock which is inert to the reactants. The partition 31 is solid, is substantially the same as and corresponds to the weir partitions 22 and 22' and establishes the liquid level in the mixing section 17. The partition 32 is perforated.

Figure 4:
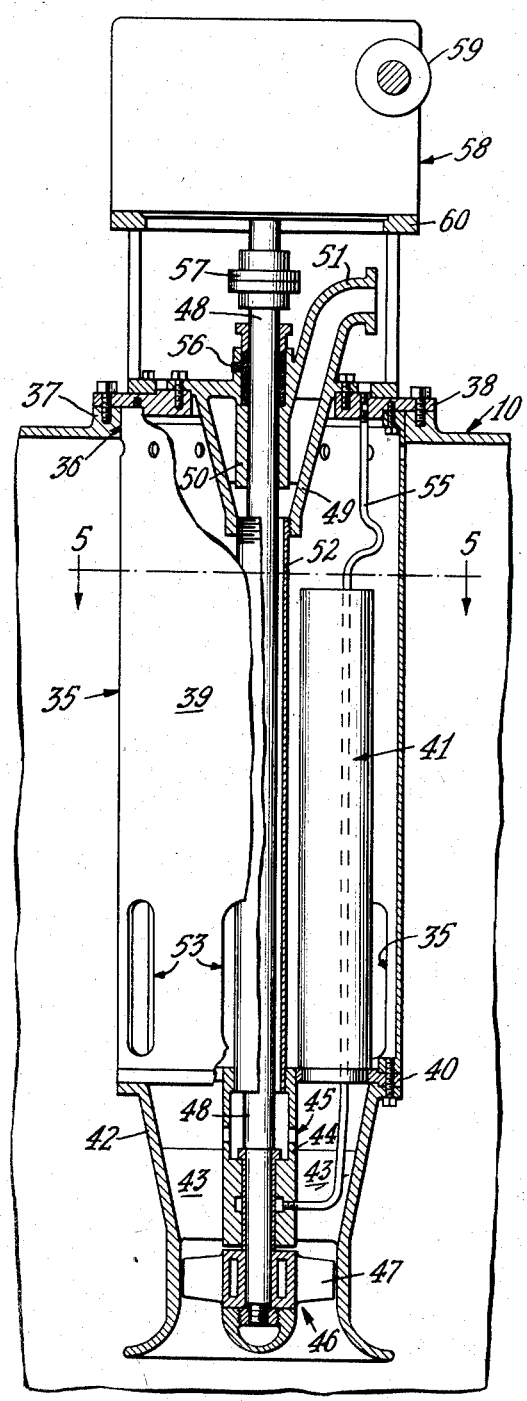
Fig. 4 is an enlarged view partly in section of the mixing device employed.
Figure 5:
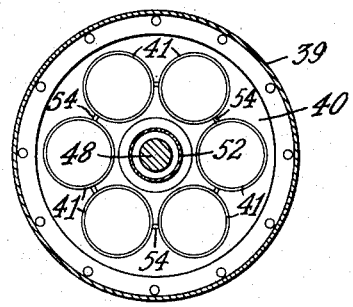
Fig. 5 is a sectional view taken on line 5—5 of Fig. 4.

Each of the mixing sections 15, 16 and 17 has a mixer provided therein. The mixers 35, 35a and 35b are identical in construction so that the description of one of them, the mixer 35, will suffice for all. The mixer 35, shown in detail in Figs. 4 and 5, is mounted in a circular opening 36 formed in the top of the section 15 and with its lower inlet end spaced from the plate 24 and overlying the hole 25 therein. The hole 25 is smaller than the inlet of the mixer 35. The relative areas of the inlet of the mixer 35 and the hole 25 and the spacing of said inlet from the plate 24 are so proportioned and adjusted that all the material supplied to the hole 25 enters said inlet while permitting entrance of desired quantities of material through the space between the hole 25 and said inlet. To this end also, the hole 25 may have an upwardly extending rim or lip united to its periphery (not shown). The walls of the opening 36 are built up to form a flange 37 of appropriate size to support the mixer 35 while in operation. The mixer 35 is suspended from an annular flange ring 38 whose outer peripheral portion rests on the face of the flange 37 and is fastened thereto by a circular series of bolts. Extending downward from the flange ring 38 and fastened rigidly thereto, as for instance by a circular series of bolts, is a cylindrical shell 39 of a diameter to fit loosely within the opening 36. The shell 39 extends downwardly into the mixing section 15 a substantial distance and is closed at its lower end by an annular tube sheet 40 which carries a circular series of tubes 41 extending upwardly therefrom.

An impeller housing 42 is positioned beneath the tube sheet 40. The shell 39, the tube sheet 40 and the impeller housing 42 are fastened together into a unit by means of a circular series of studs which enter tapped holes in a flange at the lower end of the shell 39 and carry suitable nuts threaded thereon which bear against a flange formed at the periphery of the impeller housing 42. The housing 42 is preferably formed as a casting and includes internal deflector webs 43 connecting the housing 42 to a bearing supporting structure 44 which is hollow at its upper end and is provided thereat with ports 45. A suitable impeller 46 provided with blades 47, is mounted on the central shaft 48 which is journaled in the structure 44 and extends vertically therethrough.

The central opening of the flange ring 38 is covered by the peripheral flange of the hollow member 49, said peripheral flange and the flange ring 38 being united by a circular series of bolts as shown. The hollow member 49 is conical in shape and includes webs which support the bearing structure 50 for the upper end of the shaft 48. A nozzle construction 51 is provided for supplying one of the reactants to the hollow of the member 49. A vertical tubular member 52 surrounds the shaft 45 and connects the hollow of the member 49 to the hollow upper end of the bearing support structure 44 so that the reactant that is introduced through the nozzle 51 may flow from the hollow of the member 49 through the tubular member 52 into the hollow of the structure 44 to be discharged through the ports 45 into the outlet of the impeller housing 42. As an alternative construction, the ports 45 may be eliminated and in their stead a transverse bore may be provided in each of the deflector webs 43, said transverse bores being placed in communication through suitable bores with the hollow upper end of the member 44. The reactant may flow out of the transverse bores through a plurality of small holes in the face of the deflector webs 43 or through holes in the slip stream end of the webs 43 (this alternative construction is not shown).

The upper end of each of said tubes 41 terminates a substantial distance below the flange ring 38 so that sufficient space is provided for the reversal of direction of flow of the material propelled through the tubes 41 by the impeller 46. After the flow reversal just mentioned, the propelled material flows downwardly in the space between the tubes 41, the tubular member 52 and shell 39 to exit from the series of elongated holes 53 located adjacent the bottom end of the shell 39. A series of comparatively small gas vent holes are provided adjacent the top end of the shell 39 to prevent gas accumulation in the flow reversing space between the upper end of the tubes 41 and the flange ring 38. The tubes 41 may be fixed against lateral movement by the provision of suitable connections 54 arranged as needed along the length of the tubes 41 to maintain them in proper space relation as shown in Fig. 5.

For the lubrication of the bearings in the structure 44 a suitable connection 55 is provided; any suitable lubricant may be employed. Similarly, the upper bearing structure 50 may be lubricated through a suitable connection 56.

Any suitable means may be provided for driving the shaft 48 and the impeller 46. Suitably, the power necessary may be applied through gear reducing means which are assembled in the housing 58 and which are in turn driven by a suitable turbine or motor, not shown, but connected to the gear reducing means at 59. The gear reducing means is in each case connected to its respective shaft 48 by means of coupling means 57. The housing 58 is supported on a pedestal structure 60 which is bolted to the flange ring 38. The driving turbine and the gear reducing means 48 may be substituted by an electric motor.

The settling zone 12 is divided by the partition 30 into acid section 62 and product section 61. The partition 30 is approximately semi-circular in shape and united to the walls of the reactor 10, as by welding. The top edge of the partition 30 is at a somewhat higher level than the top edge of the opposed perforated plate 32 of the coalizer 29. The reacted material as it passes through the coalizer 29 separates into acid and liquid hydrocarbon and layer separation of the two takes place in the acid section 62. The lighter liquid hydrocarbon being the top layer, overflows partition 30 and collects in the product section 61 while the acid settles in the bottom of the acid section 62. The liquid hydrocarbon product is removed through the pipe nozzle 63 in the bottom of the product section 61 for further processing. The acid is removed through the pipe nozzle 64 in the bottom of the acid section 62.

Each section 15, 16, 17, 61 and 62 is provided with a manhole 65 to render said sections accessible for inspection and repair. Each manhole 65 is closed by a suitable cover, as shown, during operation of the reactor 10. The sections 15, 16, and 17 are also each provided with a nozzle 66 to facilitate the removal of residual material from the respective sections during cleaning, etc. The section 14 is provided with a nozzle 67 through which the isoparaffin hydrocarbon may be introduced into the system. Section 14 as well as sections 15, 16 and 17 are each provided with a nozzle 68. The nozzles 68 may be manifolded through suitably valved lines, as shown for instance in Fig. 6, so that the tops of the sections 14, 15, 16 and 17 are placed in communication for gas flow at controlled rates from the sections 14, 15 and 16 into the section 17 and consequently into the zone 12. By suitable control of the gas flow out of sections 14, 15 and 16, these sections may be maintained under any preferred pressure arrangement, however, the pressures in the sections 14, 15 and 16 should progressively diminish but all must always be higher than the pressure in section 17 so that the pressure differential will be effective to facilitate the series flow of the reactants through the sections 14, 15, 16 and 17 and particularly so that the light reactants will flow in the acid catalyst or the emulsion phase.

The settling zone 12 includes the nozzle 69 for conducting gas from said section, as for instance to a compressor of a refrigerating system. The section 12 furthermore includes a nozzle 70 through which may be returned to the settling zone 12 any liquid material, particularly any acid, carried out by the gas stream issuing from the nozzle 69. A pipe extends from the nozzle 70 to assure the return of the material to the acid section 12 and beneath the liquid level therein. Section 15 also includes a nozzle 71 through which the acid catalyst is supplied to the reactor 10.

The reactor 10 may be variously modified without departing from the invention. Thus, in place of the specific type of mixing means shown and described, other suitable types may be used. Also, reaction zones each including two or more mixing sections and a settling section, may be disposed on each side of a single product zone and all three zones included in a single vessel.

In carrying out liquid phase reactions in the presence of a liquid catalyst which is immiscible with the reactants, as for instance in the alkylation of isoparaffin hydrocarbons in which sulfuric acid is employed as the catalyst, and using the reactor 10 above described, the isoparaffin hydrocarbon feed which comprises the isoparaffin hydrocarbon recycle feed and any fresh isoparaffin hydrocarbon feed required and not supplied by the alkylating hydrocarbon feed, after having the recycle acid catalyst added to it is introduced into the entrance section 14 through the nozzle 67, while the fresh acid catalyst feed is introduced into the bottom of section 15 and beneath the hole 25 in the plate 24 through the nozzle 71. The isoparaffin hydrocarbon feed may comprise a single isoparaffin hydrocarbon or a mixture of such hydrocarbons or a mixture comprising one or more isoparaffin hydrocarbons and one or more normal paraffin hydrocarbons. Alternately the section 14 may be eliminated and the isoparaffin hydrocarbon feed as defined above and without the addition of the acid catalyst recycle, supplied directly to the inlet of the mixer 35 through the nozzle connection 71 while the recycle acid catalyst and the fresh acid catalyst after being joined are supplied to the bottom of the section 15 through the nozzle 66. It is also possible, though not preferable, when the section 14 is eliminated, to locate the nozzle 67 on the axis of the mixer 35 and the nozzle 71 adjacent thereto and beneath the plate 24 so that the isoparaffin and the acid catalyst enter the reactor 10 at substantially the same location at the bottom entrance to the mixing section 15.

The alkylating hydrocarbon feed which may be a single olefin hydrocarbon, or a mixture of olefin hydrocarbons, or a mixture of one or more olefin hydrocarbons and one or more isoparaffin hydrocarbons, which may also include one or more normal paraffin hydrocarbons, is divided into three separate parallel streams and a separate stream enters each of the mixers 35, 35a and 35b through the respective nozzles 51. The isoparaffin hydrocarbon content of the alkylating hydrocarbon feed may be less than, or equal to, or more than, the quantity required for alkylation reaction with all of the olefin hydrocarbon present. The alkylating hydrocarbon feed introduced into the nozzle 51 will flow downward through the tubular member 52 to exit out of the ports 45 at the outlet of the impeller 46 to be admixed thereat with the acid catalyst and isohydrocarbon feed pumped by the impeller blades 47. The impeller 46 is operated at relatively high speeds in a manner to impart high velocity to the liquid presented to it so that it rapidly and intimately intermixes the acid catalyst, the isohydrocarbon, and the alkylating hydrocarbon and forms therefrom an emulsion. The emulsion is further formed or maintained by the high velocity flow thereof through the tubes 41, by the rapid change in direction in the space above the tubes 41 and the flow through the comparatively restricted passages between the tubes 41, the shell 39 and the tubular member 52. The flow of the emulsion at high velocity and in the manner described, produces shearing effects whereby the droplets of the emulsion, which ordinarily contain the isoparaffin reactants, are continuously subdivided to present new surfaces for reaction and to present a large area of contact between the phases. The constant shearing of the droplets provides continuous presentation of fresh isoparaffin reactants at the surfaces of the droplets, which is the location apparently at which reaction occurs. The mixing of the catalyst and reactants, as accomplished by the mixers 35, 35a and 35b also results in the frequent replacement of the layer of acid catalyst immediately adjacent the droplets that contain the reactants. The capacity of the impeller 46 is greatly in excess of that required merely to pump the acid catalyst, the isohydrocarbon and the alkylating hydrocarbon supplied through the nozzles 71 and 67 and the ports 45 respectively through its respective mixing section so that a rapid recirculation of the emulsion within its respective mixing section takes place and the mixers 35, 35a and 35b are positioned sufficiently above the respective plates 24, 24' or 24" to facilitate the recirculation action. The capacity of each of the mixers 35, 35a and 35b is such that material presented to each of them is recirculated fifteen, or more, times before it leaves the respective reaction section 15, 16 or 17.

By maintaining a proper pressure relation between the sections 14, 15, 16 and 17, the emulsion overflows the baffle 22 in section 15 to flow downward through the passageway 28 and into the passageway 20', from thence to flow through the hole 25' and to be presented to the mixer 35a at a rate substantially equal to the combined rate of acid catalyst and hydrocarbon input. The mixing and recirculation action is repeated in mixing section 16 but with the admixture of a fresh supply of alkylating hydrocarbon, and again emulsion flows over the weir 22' to the hole 25" and to the bottom of the mixing section 17 at a rate substantially equal to the combined rate of the acid catalyst and hydrocarbon input. In the mixing section 17, the mixing and circulating action is again repeated and again with admixture of a fresh supply of alkylating hydrocarbon.

The mixing section 17 is in open communication with the settling zone 12 and at the same pressure as the settling zone 12, hence flow of material from the mixing section 17 to the acid section 62 does not take place because of a difference in static pressure but rather because of different pressure heads. To this end, acid catalyst and product are drawn off through nozzles 64 and 63 respectively, at such rates as to maintain the liquid level in the product section 61 below the liquid level in the acid section 62 and the liquid level in the acid section 62 below the emulsion level in the mixing section 17. The top of the deflector baffle 13 is at such a level as to prevent normal as well as accidental flow of the emulsion in the mixing section 17 thereover.

The emulsion leaves the mixing section 17 over the top of the weir partition 31 and flows through the coalizer 29 for flow into the acid section 62 of the settling section 12. In flowing through the coalizer 29, the emulsion is broken down into two continuous phases. In the acid section 62 the lighter hydrocarbon separates as a layer on the heavier acid catalyst to overflow the partition 30 into the product section 61 wherefrom it is withdrawn through the nozzle 63 for further processing. The acid which collects in the bottom of the section 62 is withdrawn in part for recirculation and in part for reconditioning.

The reaction described is exothermic and in order to maintain the desired temperature range, the sections 14, 15, 16, 17 and the zone 12 must be cooled. The necessary cooling effect may be obtained in various ways as by employing various devices, such as coils through which a cooling medium is circulated, etc. The reaction and the apparatus used in carrying it out are such, however, that auto-refrigeration is ideally suited. The isohydrocarbon input is vaporized in the various sections mentioned at sufficient rates at the operating pressures to produce a refrigeration effect sufficient to maintain the predetermined temperature.

When the apparatus and process of the invention are employed in carrying out exothermic reactions in which the heat developed causes vaporization of a portion of the liquid reactants during the process, the method of introducing the alkylating hydrocarbon feed to the mixers 35, 35a and 35b is particularly advantageous. For example, in the alkylation of isoparaffin hydrocarbons with olefin hydrocarbons under conditions of temperature and pressure permitting continuous vaporization of unreacted hydrocarbons for temperature control purposes, it is particularly advantageous to introduce the olefin reactants at the outlet or high pressure side of the impeller 46. In view of the relatively low concentration of olefins maintained in the reactor 10 as a whole, it is evident that the alkylation reaction, and the development of exothermic heat of reaction, are most intense at the point where the olefin reactants are admixed with the isoparaffins and the acid catalyst. The vaporization of the mixture at that point, therefore, is relatively high. Consequently, the introduction of the olefin feed through the ports 45 into the high pressure side of impeller 46 has the advantage of permitting vaporization without interferring with circulation. The introduction of the fresh feed in this manner also accomplishes substantially instantaneous and complete mixing of the olefin reactants with the acid and the isoparaffins discharged from the impeller and the resulting mixture is then immediately driven through the tubes 41 to promote intimate and effective contact of reactants and catalyst. Furthermore, since each impeller 46 is arranged to recirculate the acid catalyst and the isoparaffin content of its respective mixing section many times past the ports 45 through which the olefin reactants are supplied, this results in effect in multiplying the ratio of isoparaffin hydrocarbon to olefin hydrocarbon many times. Thus, if the ratio of isoparaffin hydrocarbon to olefin hydrocarbon supplied to the reactor 10 is in the order of about 4:1, the ratio for each mixing section will be about 10:1. If each impeller 46 recirculates the content of its respective mixing chamber 15 to 40 times the mentioned, ratio is increased to the order of 150 to 400 to 1. The olefin hydrocarbons are thus immediately upon introduction into the reaction zone, subjected to optimum conditions for promoting alkylation reactions with a minimum hydropolymerization and the objectionable products thereof.

The heat of the alkylation reaction and the heat developed in the mixing operation necessitates some means for cooling the reaction zone to maintain the reaction temperature at the desired level. Heat may be extracted from the body of liquids in the reaction zone by indirect heat exchange with an external refrigerating means. Preferably, however, internal refrigeration is effected by permitting continuous evaporation of unreacted hydrocarbons which are withdrawn from the mixing sections, condensed, cooled, and returned for further treatment. Isobutane available for charge material to an alkylation process ordinarily occurs in mixtures which contain substantial quantities of normal butane. A substantial proportion of propane also may be present. Inasmuch as these hydrocarbons, together with the isobutane, constitute the lowest boiling constituents in this portion of the reaction mixture which are heated by the exothermic reaction, refrigerating the reaction mixture by evaporation results in the separation from the reaction mixture of vaporized hydrocarbons consisting of isobutane, normal butane and propane and predominating in isobutane. Such a mixture is condensed and returned to the reaction zone 11. Suitably all or a portion thereof may be fractionated to separate propane to be discarded. This method of eliminating propane is advantageous because the mixture thus treated has a higher concentration of propane than any other hydrocarbon mixture in the system. Sufficient propane is thus eliminated to balance the amount introduced into the system as fresh feed.

The quantity of propane maintained in the reaction zone 11 may be regulated to provide the degree of evaporation necessary to abstract the heat of reaction at the conditions of temperature and pressure at which it is desired to conduct the reaction.

Figure 6:
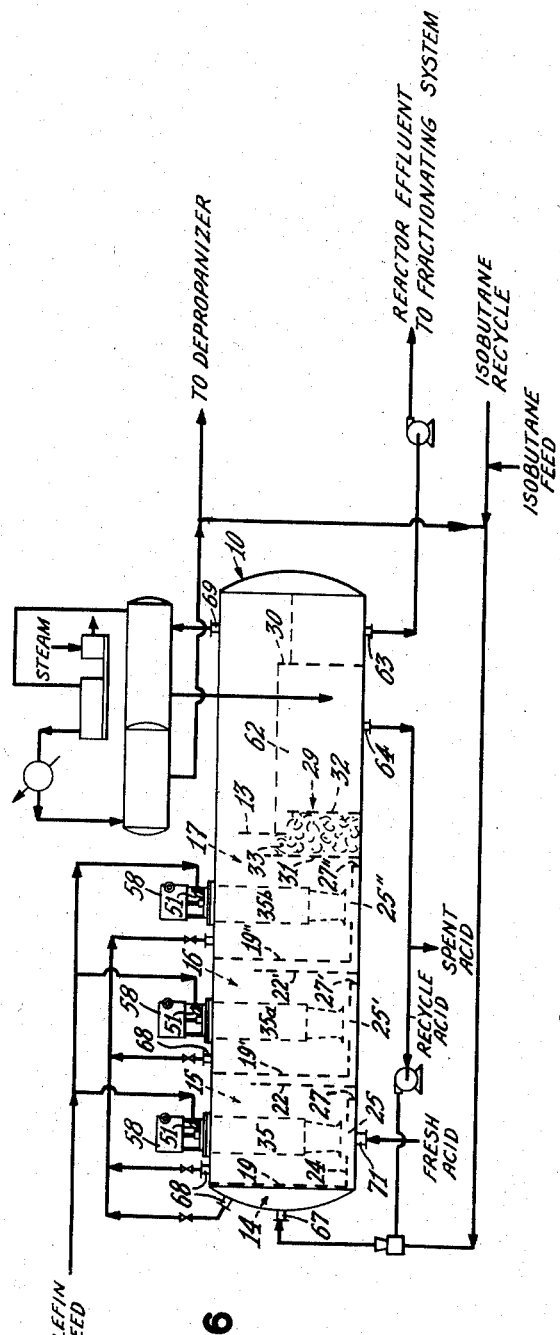
Fig. 6 is a diagrammatic view of the apparatus set up for carrying out the novel process of the invention.

The schematic showing of Fig. 6 indicates how the apparatus described in detail and shown in Figs. 1 to 5 is hooked up in a catalyst installation. In Fig. 6, the arrangements employed for preparation of the various feeds, the treatment of the acid catalyst and the treatment of the product have been omitted as such arrangements are largely conventional and known in the art. For example, Patent No. 2,429,205 shows feed preparation and product treatment arrangements suitable for use in connection with the carrying out of the process of the present invention.

Referring to Fig. 6, the reactor 10 is arranged for use in a process in which the reaction mixture is cooled by internal refrigeration in the manner described above. The sections 14, 15, 16 and 17 are in communication at the upper portions thereof by a piping arrangement which interconnects the nozzles 68 of the respective sections. The piping arrangement includes suitable valving adjacent each of the nozzles 68 so that the flow out of the individual sections may be independently controlled and any predetermined pressure pattern established and maintained. The nozzle 69 at the product end of the settling zone 12 is connected through suitable piping to the refrigeration system. This system includes a pump which withdraws vapors through the nozzle 69, compresses them, and then passes them to a heat exchanger wherein they are condensed and from whence they are passed to a collection drum. A portion of the condensed gases is returned to the reactor 10 through the isobutane recycle line while the remainder is passed to the depropanizer whereat propane is removed to balance the amount added to the system by the fresh hydrocarbon feed or feeds. After depropanization, the stream is returned to isobutane recycle feed and passed by suitable piping to the nozzle 67 for admission to the entrance section 14. The refrigeration system includes a drum, between the nozzle 69 and the pump, in which any liquid carried over by the vapors is collected and returned to the nozzle 70 and the pipe attached thereto for injection below the liquid level in the acid section 62. The alkylating feed is divided into three streams and conducted to the nozzles 51. Acid is withdrawn through the nozzle 64. A portion of the withdrawn acid is removed from the system as spent acid while another portion is returned as recycle acid with the isobutane recycle. Fresh acid feed is introduced to the section 15 through the nozzle 71. The product is removed from the product section 61 through the nozzle 63 and conducted through suitable piping to the product treating system.

In the alkylation of isobutane with butenes, or propylenes, or amylenes, or a mixture of two or more of these olefins, the olefin feed is divided, as shown in Fig. 6, into three more or less equal streams and passed to the mixers 35, 35a and 35b. The olefin feed usually readily available in a refinery for the alkylation of isobutane, includes both paraffin and olefin hydrocarbons, and of the paraffin hydrocarbons, both the iso and the normal forms; the hydrocarbons in the olefin feed range from C2 to C5 with the olefin content generally made up of propylene and butene, isobutane is the only isohydrocarbon present. The isobutane content of the olefin feed usually approximates that required to react with all of the olefin hydrocarbons present. Thus, the isobutane feed is largely a recycle feed and is provided in such quantity as to maintain the preestablished isobutane to olefin ratio. This ratio is usually in the order of 10:1 in individual mixing chambers, in accordance with the present invention isobutane to olefin ratios in the order of 8:1 for the individual mixing sections and in the order of 3:1 for the whole reactor 10 are preferred. The isobutane feed usually readily available in a refinery contains a mixture of normal and isoparaffin hydrocarbons ranging from ethane to pentane and including propane and normal butane in substantial proportions. The acid catalyst may be supplied at rates to maintain an acid to hydrocarbon ratio of as low as 1:1 but higher ratios in the order of 2:1 are preferred and can efficiently be handled in the method of the present invention.

The isobutane recycle, the olefin feed, the fresh acid and the recycle acid are introduced into the system and serially passed through the mixers 35, 35a and 35b to form an emulsion and to promote the alkylation reaction, as described heretofore. The action in the mixers 35 to 35a and 35b circulate the content of their respective mixing sections past the respective olefin feed inlet at such speed as in effect to increase the ratio of isobutane to olefin to the order of 150:1 and more, so that the reaction takes place with a minimum formation of objectionable compounds due to "hydropolymerization." The lighter constituents of the isobutane recycle feed vaporize in the sections 14, 15, 16 and 17 to cool the content of the respective sections and to maintain a preestablished low temperature, usually 35° F. By adjustment of the valve means in the piping through which the vapors flow out of the sections 14, 15, and 16, desired pressures may be maintained in the respective mixing sections. Thus by way of example, the valving may be set to maintain a pressure of 8 p.s.i. in the section 14, a pressure of 7 p.s.i. in the section 15, a pressure of 6 p.s.i. in the section 16, and a pressure of 5 p.s.i. in the section 17 and the settling zone 12.

The vapor withdrawn from the sections 14, 15, 16 and 17 is compressed and then condensed. A portion of the condensed vapors is returned to the system with the isobutane feed while the remainer is passed to the depropanizer for removal of propane as required to balance the input of propane through the olefin feed. After depropanization said remainder is returned to the isobutane recycle. Fresh acid is added to the system at a sufficient rate to maintain the required catalyst activity, a corresponding amount of acid is withdrawn from the system as spent acid while a portion is withdrawn for recycle. The alkylated product is withdrawn from the reactor 10 and passed to a fractionating system. The material separated from the alkylated product and corresponding in composition to the isobutane recycle feed is passed to the isobutane recycle feed.

For a specific example of the operation of the apparatus and the method of the invention, reference may be had to a specific use. In the specific use, the alkylation installation was of such a size that it produced 1690 barrels per day of alkylate product. For this quantity of product, the olefin feed employed was 3044 barrels per day made up of:

| Hydrocarbon: | Barrels per day |
|---|---|
| Ethane | 4 |
| Propylene | 156 |
| Propane | 504 |
| Isobutane | 1135 |
| Butene | 830 |
| Normal butane | 401 |
| Pentane | 14 |

The isobutane recycle was 9198 barrels per day made up of:

| Hydrocarbon: | Barrels per day |
|---|---|
| Ethane | 3 |
| Propane | 841 |
| Isobutane | 7485 |
| Normal butane | 852 |
| Pentane | 17 |

The fresh acid feed was 133 barrels per day; 160 barrels per day of acid were removed from the system as spent acid while 345 barrels per day of acid were removed from the system and recirculated by admission thereof to the isobutane recycle line so as to be admitted with the isobutane recycle into section 14. A total of 505 barrels per day of acid were withdrawn from the acid section 62. 5289 barrels per day were withdrawn from the production section 61. This material was made up of 1690 barrels per day of alkylate and 3599 barrels per day of material of a composition approximating that of the isobutane recycle. The latter material was returned to the system as part of the isobutane recycle.

In operating in accordance with this specific example, the temperature in the reactor was maintained at 35° F. To attain this temperature, the valves in the vapor lines which connect the sections 14, 15, and 16 to the section 17 were adjusted to maintain a pressure in the section 14 of 8 p.s.i., in the section 15 of 7 p.s.i., in the section 16 of 6 p.s.i., and in section 17 and the settling zone 12 of 5 p.s.i. To handle the refrigeration load, 6553 barrels of liquids per day were evaporated and removed from the settling zone 12. The 6553 barrels per day of condensed vapors were composed of:

| Hydrocarbon: | Barrels per day |
|---|---|
| Ethane | 7 |
| Propane | 1105 |
| Isobutane | 4740 |
| Normal butane | 672 |
| Pentane | 17 |

The mixers 35, 35a and 35b were operated at such speed so that the flow therethrough past the olefin feed inlet was such as to multiply the isobutane to olefin ratio approximately twenty-five times so that the apparent isobutane to olefin ratio was increased to the order of about 200:1.

The superior results obtained by the use of the novel apparatus and novel process are apparent from a consideration of the following comparative data, column 1 being data derived from conventional practice, while column 2 being data derived from practice in accordance with the present invention.

| | | |
|---|---|---|
| Production (Barrels/Stream Day) | 1,211 | 1,201 |
| Space Velocity (Volume of Acid/Volume of Olefins/Hr.) | 0.30 | 0.302 |
| Isobutane in Reactor Effluent (Liquid Volume Percent) | 51.3 | 53.1 |
| External Isobutane to Olefin Ratio per Mixing Section | 9.0 | 9.25 |
| Internal Isobutane to Olefin Ratio at 2-1 Acid to Hydrocarbon Ratio | 149 | 159 |
| Lbs. Acid Consumed/gal. Alkylate Produced | 1.89 | 1.35 |
| Spent Acid Strength, Wt. Percent | 94.4 | 95.2 |
| Rerun Yield of 338° F. End Point Alkylate (Lt. Alkylate) | 85.7 | 91.2 |
| Octane Number: | | |
| F-1 Clear— | | |
| Total Alkylate | | 92.8 |
| Light Alkylate | 93.2 | 93.6 |
| F-2 Clear— | | |
| Total Alkylate | | 91.3 |
| Light Alkylate | | 91.8 |
| Octane Rating Performance Number: | | |
| F-3+4.6 cc. TEL Light Alkylate | 119 | |
| F-4+4.6 cc. TEL Light Alkylate | 147 | |

In the above F-1 is equivalent to Research Octane Knock Rating; F-2 is equivalent to ASTM Motor Octane Knock Rating; F-3 is equivalent to Lean Mixture Method Knock Rating for aviation gasolines; and F-4 is equivalent to Rich Mixture Method Knock Ratings for aviation gasolines.

Since many changes may be made without departing from the scope of the invention herein involved, it is intended that all matter contained in the above description or shown in the accompanying drawings shall be interpreted as illustrative and not limitative.

We claim:

1. In apparatus for effecting liquid phase catalytic reactions, a reactor comprising an elongated, closed tank adapted in use to be substantially horizontally disposed, a plurality of spaced partitions closing the full cross section of said tank and subdividing internal space thereof into a plurality of separate, series arranged sections, each of said section closing partitions having a lower portion thereof cut away to provide a port for entrance from the section on one side thereof to the section on the other side thereof, plate means in each of the sections and on the other side of the respective section closing partition having one end united to the cut edge of the respective partition and its lateral edges united to the walls of the tank to provide a passageway, barrier means in each of said sections united to the other end of the respective plate means and the walls of the tank to close said passageway, a hole in each of said plate means adjacent the middle region of the respective section to provide an inlet for the respective section, mixing means in each of said sections including a propelling device having an inlet mouth spaced from and overlying the inlet hole in its respective plate means, each of said sections including a level defining partition therein united to the walls of the tank and having its upper portion removed to establish a desired liquid level, each of said level defining partitions being spaced from the contiguous section closing partition to provide a downflow passageway to the entrance port of the adjacent downstream section for material overflowing the level defining partition.

2. The apparatus for effecting liquid phase catalytic reactions as set forth in claim 1 in which, the furthest upstream one of said section closing partitions is spaced from one end of the tank by a distance sufficient to provide an admission section between said partition and said one end for materials employed in the catalytic reaction.

3. In apparatus for effecting liquid phase catalytic reactions, a reactor comprising an elongated, closed ended vessel of substantially circular section adapted in use to be approximately horizontally disposed, a plurality of spaced disc-like partitions united to the vessel walls and dividing an end zone thereof into a plurality of separate, series arranged mixing sections, each of said disc-like partitions having a bottom section cut away to provide a port for entrance from the section on one side thereof to the section on the other side thereof, a plate in each of said sections on the other side of the respective disc-like partition having one end united to the cut edge of the respective disc-like partition and its sides united to the vessel walls to provide a passageway, means united to the vessel walls and the respective plate for closing the end of said passageway in the respective mixing section, a hole in each of said plates for entrance into the respective mixing section from each passageway, mixing means mounted in each of said sections including a propelling device having an inlet mouth spaced from and overlying the inlet hole in its respective plate, and a liquid level establishing partition on said one side of each of said disc-like partitions, said liquid level establishing portions being a section of a disc and spaced from the respective disc-like portion to provide a passageway for the downflow of the overflowing material to the entrance port of the adjacent partition.

4. The apparatus for effecting liquid phase catalytic reactions as set forth in claim 3, in which said disc-like partitions and said liquid level establishing partitions have reinforcing means united to the faces thereof.

5. The apparatus for effecting liquid phase catalytic reactions as set forth in claim 3, in which vertically disposed elongated bars are united to the faces of said disc-like partitions and said liquid level establishing partitions, said bars being of a sufficient width to contact the face of the partition opposed to the partition to which they are united whereby the width of said downflow passageways are maintained as predetermined.

6. Apparatus for effecting liquid phase catalytic reactions comprising a mixing section having solid walls, a liquid propelling device in said mixing section, said propelling device including an inlet mouth positioned proximate the bottom of said section, an inlet port in the bottom region of one of said walls, conduit means including an outlet opening underlying said inlet mouth and spaced therefrom connecting said inlet port to the region underlying said inlet mouth whereby material entering said inlet port flows through said conduit to said outlet opening and into said inlet mouth and liquid material in said mixing section enters the space between said inlet mouth and said outlet opening to flow into said inlet mouth, an outlet port in the bottom region of one of said walls, liquid level establishing means in the top region of said section, and conduit means opening at said level establishing means and connected to said outlet port adapted to conduct liquid overflowing said liquid level establishing means to said outlet port.

7. Apparatus for effecting liquid phase catalytic reactions comprising a closed ended elongated vessel adapted in use to be approximately horizontally disposed, a plurality of transverse cross section closing partition means within said vessel and spaced along the length thereof dividing the internal space of said vessel into a plurality of contiguous, series arranged mixing sections, each of said partition means having a port in the bottom region thereof providing an inlet for liquid material into the respective section, each of said mixing sections having a liquid material propelling device therein with an outlet mouth located adjacent the bottom of the section, conduit means connected to the respective inlet port with an outlet opening located directly beneath said inlet mouth to present the liquid material entering the section directly to said inlet mouth, said outlet opening being vertically spaced from said inlet mouth to provide an aperature therebetween for flow of liquid material from the mixing zone into the said inlet mouth for circulation through said propelling device, liquid level establishing means positioned in the top region of said mixing section, and conduit means connecting said level establishing means to the inlet port in the downstream partition means of said mixing section, said partition means united to the walls of said vessel to seal the respective sections whereby adjacent sections are in communication only through the respective conduit means and port.

8. Apparatus for effecting liquid phase catalytic reactions comprising a closed ended elongated vessel adapted in use to be approximately horizontally disposed, a plurality of transverse cross section closing partition means within said vessel and spaced along the length thereof dividing the internal space of said vessel into a plurality of contiguous, series arranged mixing sections, each of said partition means having a port in the bottom region thereof providing an inlet for liquid material into the respective section, each of said mixing sections having a liquid material propelling device therein with an inlet mouth located adjacent the bottom of the section, conduit means connected to the respective inlet port with an outlet opening located directly beneath said inlet mouth to present the liquid material entering the section directly to said inlet mouth, said outlet opening being vertically spaced from said inlet mouth to provide an aperture therebetween for flow of liquid material from the mixing zone into the said inlet mouth for circulation through said propelling device, means opening at the outlet side of said propelling device defining a flow path through which liquid reactants may be introduced for admixture with the liquid material circulated through said propelling device, liquid level establishing means positioned in the top region of said mixing section, and conduit means connecting said level establishing means to the inlet port in the downstream partition means of said mixing section, said partition means united to the walls of said vessel to seal the respective sections whereby adjacent sections are in communication only through the respective conduit means and port.

9. Apparatus for effecting liquid phase catalytic reactions comprising a closed ended elongated vessel adapted in use to be approximately horizontally disposed, a plurality of transverse cross section closing partition means within said vessel and spaced along the length thereof dividing the internal space of said vessel into a plurality of contiguous, series arranged mixing sections, each of said partition means having a port in the bottom region thereof providing an inlet for liquid material into the respective section, each of said mixing sections having a liquid material propelling device therein with an inlet mouth located adjacent the bottom of the section, conduit means connected to the respective inlet port with an outlet opening located directly beneath said inlet mouth to present the liquid material entering the section directly to said inlet mouth, said outlet opening being vertically spaced from said inlet mouth to provide an aperture therebetween for flow of liquid material from the mixing zone into the said inlet mouth for circulation through said propelling device, means opening at the outlet side of said propelling device defining a flow path through which liquid reactants are introduced for admixture with the liquid material circulated through said propelling device, liquid level establishing means positioned in the top region of said mixing section, conduit means connecting said level establishing means to the inlet port in the downstream partition means of said mixing section, said partition means united to the walls of said vessel to seal the respective sections, flow defining means opening into each of said mixing sections above the level establishing means therein to interconnect the top regions of said sections, suction means connected to the lowermost downstream mixing section effective to establish a predetermined pressure therein, and valve means in said flow defining means adjustable to maintain the remainder of said mixing sections at progressively higher pressures in the upstream direction to promote flow of liquid material from the liquid level establishing means of each upstream section to the inlet port of the respective adjacent downstream section.

References Cited in the file of this patent

UNITED STATES PATENTS

| | | |
|---|---|---|
| 2,084,342 | Houghton | June 22, 1937 |
| 2,091,645 | McConnell | Aug. 31, 1937 |
| 2,238,802 | Altshuler et al. | Apr. 15, 1941 |
| 2,366,627 | Kemp | Jan. 2, 1945 |
| 2,405,158 | Mensing | Aug. 6, 1946 |
| 2,438,852 | Goldsby et al. | Mar. 30, 1948 |
| 2,474,924 | Watson et al. | July 5, 1949 |
| 2,665,196 | Poffenberger | Jan. 5, 1954 |

UNITED STATES PATENT OFFICE

CERTIFICATE OF CORRECTION

March 1, 1960

Patent No. 2,927,009

Samuel R. Stiles et al.

It is hereby certified that error appears in the printed specification of the above numbered patent requiring correction and that the said Letters Patent should read as corrected below.

Column 13, line 67, for "outlet" read -- inlet --.

Signed and sealed this 23rd day of August 1960.

(SEAL)

Attest:

KARL H. AXLINE
Attesting Officer

ROBERT C. WATSON
Commissioner of Patents